(12) United States Patent
Day

(10) Patent No.: US 7,987,479 B1
(45) Date of Patent: Jul. 26, 2011

(54) SYSTEM AND METHOD FOR DISTRIBUTION OF CONTENT OVER A NETWORK

(75) Inventor: Mark Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 2080 days.

(21) Appl. No.: 10/108,539

(22) Filed: Mar. 28, 2002

(51) Int. Cl.
*H04N 5/445* (2011.01)
(52) U.S. Cl. .............................. 725/34; 725/35; 709/219
(58) Field of Classification Search .............. 725/34–36, 725/87–116; 709/217–231
See application file for complete search history.

(56) References Cited

U.S. PATENT DOCUMENTS

| | | | | |
|---|---|---|---|---|
| 5,369,570 A * | 11/1994 | Parad | .................................. | 705/8 |
| 5,381,546 A * | 1/1995 | Servi et al. | ..................... | 718/102 |
| 5,485,609 A * | 1/1996 | Vitter et al. | ..................... | 707/101 |
| 5,532,735 A * | 7/1996 | Blahut et al. | ..................... | 725/32 |
| 5,619,247 A * | 4/1997 | Russo | ............................ | 725/104 |
| 5,790,935 A * | 8/1998 | Payton | ............................ | 725/91 |
| 5,945,987 A | 8/1999 | Dunn | ............................ | 345/327 |
| 6,006,257 A * | 12/1999 | Slezak | .......................... | 725/110 |
| 6,020,912 A * | 2/2000 | De Lang | .......................... | 725/91 |
| 6,157,377 A * | 12/2000 | Shah-Nazaroff et al. | ...... | 715/719 |
| 6,248,946 B1 | 6/2001 | Dwek | ............................... | 84/609 |
| 6,298,482 B1 | 10/2001 | Seidman et al. | .............. | 725/101 |
| 6,305,019 B1 * | 10/2001 | Dyer et al. | ....................... | 725/91 |
| 6,311,258 B1 | 10/2001 | Gibson et al. | ................. | 711/200 |
| 6,359,911 B1 | 3/2002 | Movshovich et al. | ........ | 370/536 |
| 6,434,746 B1 * | 8/2002 | Nagashima et al. | ............... | 725/5 |
| 6,606,304 B1 * | 8/2003 | Grinter et al. | .................. | 370/252 |
| 6,670,971 B1 * | 12/2003 | Oral | ............................... | 715/769 |
| 6,698,020 B1 * | 2/2004 | Zigmond et al. | ................ | 725/34 |
| 7,080,400 B1 * | 7/2006 | Navar | ........................... | 725/139 |
| 7,124,424 B2 * | 10/2006 | Gordon et al. | ................... | 725/43 |
| 7,324,966 B2 * | 1/2008 | Scheer | ............................ | 705/28 |
| 2002/0090934 A1 * | 7/2002 | Mitchelmore | ............... | 455/412 |
| 2002/0174425 A1 * | 11/2002 | Markel et al. | ................... | 725/13 |
| 2004/0117831 A1 * | 6/2004 | Ellis et al. | ........................ | 725/53 |
| 2008/0021778 A1 * | 1/2008 | Perkowski et al. | ............. | 705/14 |

* cited by examiner

*Primary Examiner* — Annan Q Shang
(74) *Attorney, Agent, or Firm* — Patterson & Sheridan, LLP

(57) ABSTRACT

Mechanisms and techniques provide a method for distributing content over a network includes receiving content elements form content sources, queuing the elements for distribution on a transmission channel, and distributing the content elements over the transmission channel to a self-selecting network. distribution of the content elements can be based upon payment information or content characteristics of the content elements. These mechanisms and techniques provide an opportunity for the distribution of content, produced by individual providers, to a wide audience.

30 Claims, 7 Drawing Sheets

SYSTEM AND METHOD FOR DISTRIBUTION OF CONTENT OVER A NETWORK

BACKGROUND OF THE INVENTION

Distribution of content, such as music, images, or text to a large audience generally includes a cost-intensive component. For example, distribution of audio content can be performed using radio or satellite broadcast. The facilities for broadcasting audio content are fairly large, complex, and capital intensive, even for low-power FM broadcasting. However, the use of radio or satellite broadcast is attractive for distribution of low-cost or free content, such as audio content, because adding an audience within a broadcast area does not create any additional costs for the broadcaster. Therefore, while broadcast of content has a low marginal cost, there is associated a high fixed cost.

Computer and information networks, such as the Internet, allow computer systems to exchange streams of data or content. Digital streaming media technologies utilize these information networks to distribute content, such as audio content, to a large audience. The use of digital streaming media is effective on a small scale because the tools, such as client computers, software, and network connection costs, have relatively low costs. The cost associated with digital streaming media involves the addition of new listeners or receivers of content to the network. Adding listeners to a digital streaming media requires additional streams of data, or bandwidth, and corresponding additional costs and resources for installing and maintaining the additional streams. For example, musicians can provide access to digital copies of their songs by a website. The more people who are interested in accessing the songs, the higher the cost of distributing the songs for the artist. Servicing multiple channels of data to multiple recipients at an increased bandwidth increases the cost for providing access that is transferred to the musicians. Digital streaming media, therefore, has a low fixed cost but a high marginal cost.

One advantage to digital streaming of content involves personalizing streams of content to a particular recipient. In the case of audio content, such streaming over a computer network is similar to the transmission of audio content by radio or satellite broadcast. The advantage, however, relates to a receiver's ability to choose the type of content he receives from a common collection of content elements available from the streaming source. In the case of audio content, the recipient can chose to receive only certain songs, only songs by a certain artist, or only songs within a certain genre, such as rock or jazz. This can be done, for example, by visiting a web site dedicated to serving a certain type of music.

SUMMARY OF THE INVENTION

Small scale content providers such as independent musicians or filmmakers are able to produce digital content, but generally are not able to distribute their content to a wide audience at a low cost. For example, distribution of audio content by small scale providers through radio or satellite transmission is impractical because a small scale provider would not necessarily have the resources to develop his own radio or satellite transmission system. Distribution of audio content through digital streaming can also be costly to small scale providers because adding listeners requires increased advertising and network bandwidth and, therefore, an increased cost.

Also, in the case of both broadcast and digital streaming media, because the costs involved with content distribution are relatively high, the content to be distributed is generally chosen by the distributor. In digital streaming, for example, the receiver, such as a user operating a web browser, can chose the type of content he receives over a computer network, but is limited to receiving content elements that are made available by the streaming source.

Small scale content providers are generally unable to have their material distributed by established broadcast or digital streaming services. These services generally distribute content that is either already known by the recipients or is expected to be well received by the recipients. Because the effect of distribution of small scale provider content on an audience is unknown, and therefore possibly not profitable, large distribution services generally do not provide the small scale provider the opportunity to distribute content over established distribution systems.

The inventive system allows sharing of high fixed costs by multiple content providers, thereby allowing an individual or small scale content distributor a low fixed costs and low marginal costs to distribute their content to a large audience. The inventive system further provides an opportunity for the distribution of individually produced content by small scale providers to a self-selecting audience.

One embodiment of the invention relates to a method for distributing content by a content distributor. The method includes the step of receiving at least one content element over a network from at least one content source. Next, the at least one content element is queued within a queue for distribution on a transmission channel. The at least one content element is then distributed over the transmission channel to a self-selecting destination.

The steps of receiving, queuing, and distributing can be repeated for a plurality of content elements. The transmission channel, therefore, supplies a continuous stream of content to self-selecting destinations.

The method for distributing content can also include the step of receiving a descriptive information portion associated with the at least one content element. The descriptive information portion can include payment information related to the at least one content element or can include at least one content characteristic.

In the case where the descriptive information portion includes payment information, the payment information can determine at least one distribution characteristic of the content element. The distribution characteristic is used in directing the content element to a receiver. The distribution characteristic can include a determination of a transmission channel for distribution of a content element, a fidelity of distribution of a content element, a duration of distribution of a content element, or a frequency of distribution of a content element.

Payment information can also influence the arrangement of content in a queue. For example, a content distributor can receive a first payment information characteristic for a first content element and a second payment information characteristic for a second content element. The first content element and the second content element can be arranged within the queue based upon a comparison between the first payment information and the second payment information.

In the case where the distribution characteristic comprises a content characteristic, the content characteristic can be chosen from the group consisting of a title of a content element, a description of a content element, a type of a content element, a source of a content element, a transmission channel designation for distribution of a content element, or a length of a content element. Distribution of the content element on a transmission channel can be based upon the content characteristic of the content element. A content characteristic of the content element can also be used to determine the arrangement of the at least one content element within a queue.

Transitional elements and default elements can also be distributed by the content distributor, based upon the presence of a content element within the queue. The method of distributing content can also include the step of determining the presence of at least one content element within the queue. When at least one content element is present within the queue, a transitional element can be distributed over the transmission channel prior to distribution of a content element located within the queue. A default element can be distributed over the transmission channel in the absence of at least one content element within the queue. When a default element has been distributed over a transmission channel and a content element enters the queue, the content distributor can determine a transition point in the default element. The transition point allows for distribution of the content element without a disruption in the flow of content elements from the content distributor.

In distributing content elements over different transmission channels, either a content source can determine the transmission channel for distribution of the content element or a queue mechanism can determine a transmission channel for distribution of the content element.

Another embodiment of the invention relates to a computerized device having at least one communications interface, a memory, a processor, and an interconnection mechanism coupling the at least one communications interface, the memory and the processor. The memory is encoded with a distribution application that when performed on the processor, produces a distributor process that causes the computerized device to perform the operations of receiving at least one content element over the at least one communication interface from at least one content source, queuing the at least one content element within a queue in the memory for distribution on a transmission channel, and distributing the at least one content element over the transmission channel, via the at least one communications interface, to a self-selecting destination.

Another embodiment of the invention relates to a computer program product having a computer-readable medium with an encoded computer program logic. When the computer program product is performed on a processor in a computerized device having a coupling of a memory, a processor, and at least one communications interface, the computer program product provides a method for performing the operations of receiving at least one content element over a network from at least one content source, queuing the at least one content element within a queue for distribution on a transmission channel, and distributing the at least one content element over the transmission channel to a self-selecting destination.

Another embodiment of the invention relates to a computerized device having at least one communications interface, a memory, a processor, and an interconnection mechanism coupling the at least one communications interface, the memory and the processor. The memory is encoded with a distributor application that when performed on the processor, produces a means to distributing content, such means including a means for receiving at least one content element over the at least one communications interface from at least one content source, a means for queuing the at least one content element within a queue in the memory for distribution on a transmission channel, and a means distributing the at least one content element over the transmission channel, via the at least one communications interface, to a self-selecting destination.

BRIEF DESCRIPTION OF THE DRAWINGS

The foregoing and other objects, features and advantages of the invention will be apparent from the following more particular description of preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The system of the invention allows musicians or filmmakers, for example, the ability to submit their music or films to a server for distribution to a mass audience. The server can distribute the music or film to channels allocated for specific types of music or films. For example, a jazz musician can have his music distributed over a jazz transmission channel and a documentary film maker can have his documentaries distributed over a documentary film transmission channel. The system allows a self-selecting audience to choose the material it wants to receive. The system also provides for a continuous stream of music or film to be distributed to the audience where no portions of "dead air" are present. The system provides the continuous stream regardless of the lack of music or film material submitted to the server. For example, a user can receive a continuous stream of music from a channel even if no musicians submit their own music for distribution over the channel.

Figure 1:
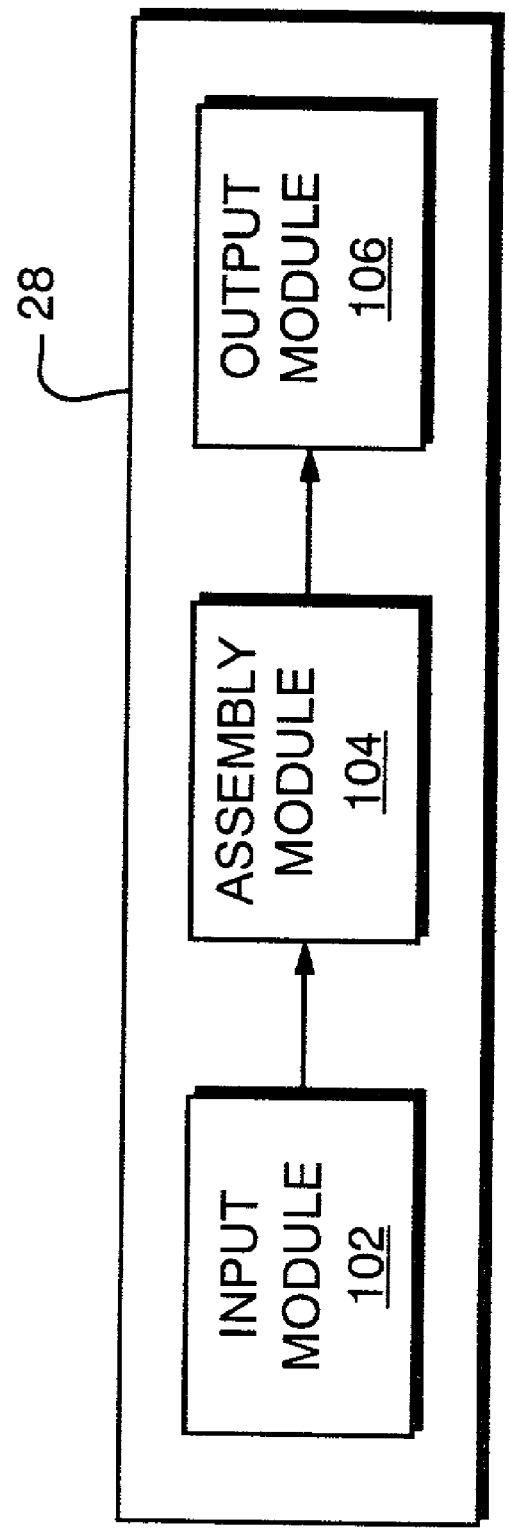
FIG. 1 illustrates a content distributor configured according to one example embodiment of the invention.

FIG. 1 illustrates a representation of a content distributor 28 configured according to one embodiment of the invention. Generally, the content distributor 28 receives content or content elements over a network from separate content sources and transmits the content to self-selecting destinations. The content elements can include text, audio, or video data, for example.

The content distributor 28 includes an input module 102, an assembly module 104, and an output module 106. The input module 102 receives content elements from content sources. These content sources can include client computers connected to a network, for example. The input module 102 transfers the content to the assembly module 104. The assembly module 104 stores the content elements in a particular order for distribution over the network. The assembly module 104 can include, for example, a queue for storage of content elements and a queuing mechanism to organize the content elements within the queue. The content elements within the assembly module 104 can then be transferred to the output module 106 for distribution over a network.

Figure 2:
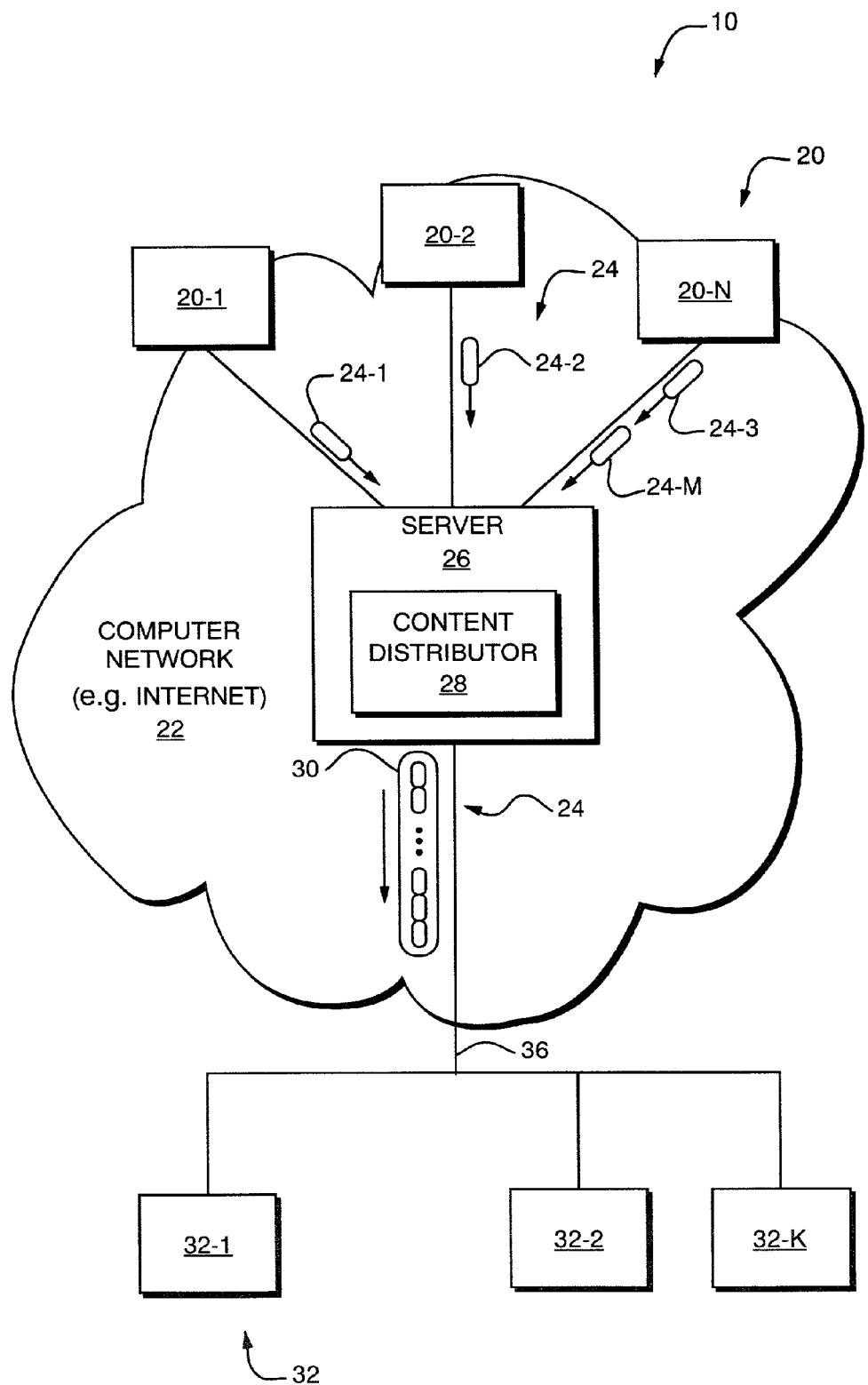
FIG. 2 illustrates a content distribution system distributor configured according to one example embodiment of the invention.

FIG. 2 illustrates an example of a system for distributing content, configured according to embodiments of the invention, given generally as 10. The content distribution system 10 can distribute content having a type of encoding format over one or more channels designed for that format. For example, the system 10 can be configured to distribute either MPEG, WAV or TXT files over respective channels designed for these data types. Alternately, the system 10 can be configured to distribute multiple file formats over different respective channels. The content distribution system 10 includes content sources or submitters 20. The content sources 20 are connected to a content server 26 by a network 22. For example, the network 22 can be the internet or can be a local area network (LAN). The content sources 20 provide content elements 24 to the content distributor 28 over the network 22. Each content source 20 connected to the network 22 can provide either single or multiple content elements of the same or different types. For example, a plurality of content sources 20-1, 20-2, 20-N provides content elements shown as 24-1, 24-2, 24-3, and 24-M. The content sources 20-1 and 20-2 each provide single content elements 24-1 and 24-2, respectively. The content source 20-N provides multiple content elements 24-3 and 24-M to the content distributor 28.

The content distributor 28 is located on a content server 26 configured according to embodiments of the invention. The content distributor 28 receives the content 24 from the source 20, queues the content 24 for distribution, and distributes the content 24 to a transmission channel 36. Content 24 is distributed by the content distributor 28 as a content stream 30. The content stream 30 is provided as a seamless distribution of individual content elements with no gaps or discontinuities. As such, default or filler content can be transmitted between the submitted content elements. The continuous content stream 30 is delivered to a transmission channel 36 for distribution to one or more content receivers 32 who choose to receive the content.

The content receivers 32 can include, for example, content receivers 32-1, 32-2, and 32-K. The content receivers 32 are connected to the transmission channel 36 and represent self-selecting destinations for the content stream 30. The computer content receivers 32 are described as self-selecting destinations because the content receivers 32 elect to receive the content 24 being transmitted. The content sources 20, therefore, transmit content elements 24 to the server 26 for distribution to unknown recipients and thus do not know ahead of time the identity of the content receivers 32 that receive the content elements 24 or the content stream 30.

Figure 3:
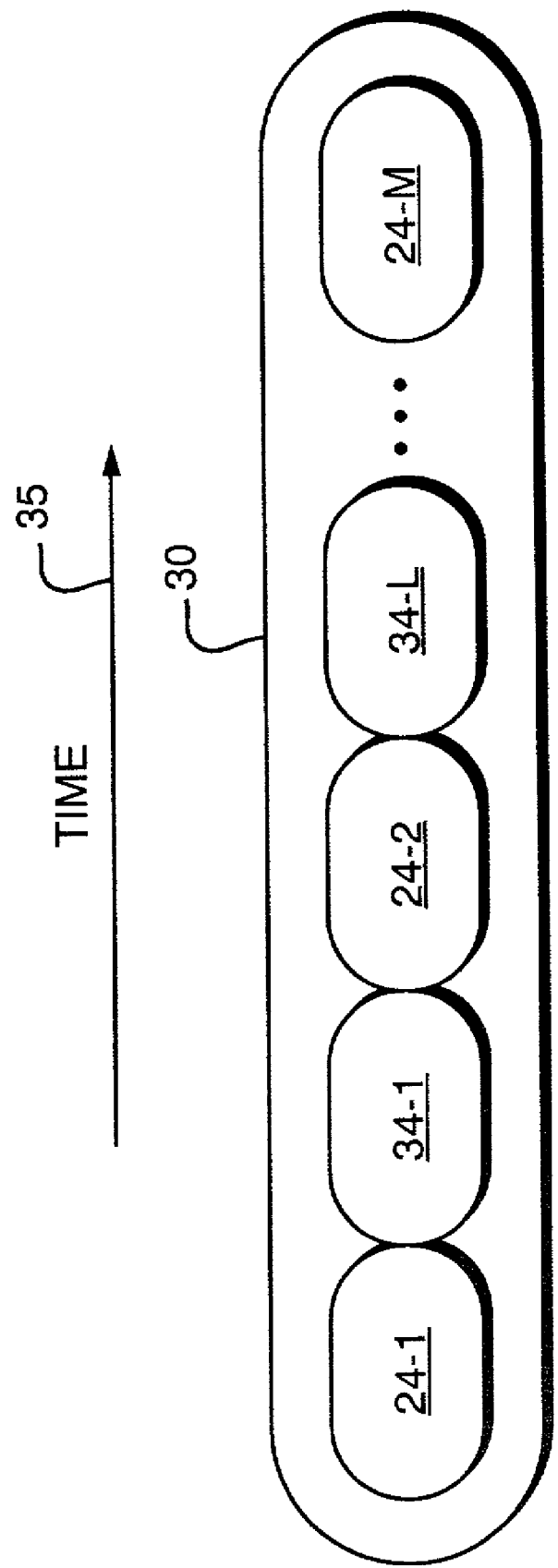
FIG. 3 illustrates a content stream as distributed by a content distributor.

FIG. 3 illustrates, in detail, an embodiment of the content stream 30 shown in FIG. 2. The content stream 30 includes content elements 24-1, 24-2 and 24-M. As described above, the content elements 24 are submitted to the content distributor 28 by content sources or submitters 20. The content distributor 28 queues and organizes the content elements 24 for distribution as a content stream 30, as explained below. The content distributor 28 can also include, within the content stream 30, content fill elements 34 interposed between the content elements 24. The content fill elements 34 are illustrated as a 34-1 and 34-L, and can include default elements and transitional elements.

A default element can be inserted in the content stream 30 when no other content elements 24 are available within the queue for distribution. Insertion of a default element within the content stream 30 prevents transmittal of a discontinuity or a "gap" within the stream 30, and thereby provides a continuous transmittal of content 24 to a receiver 32. For example, for audio content, such a discontinuity creates a silence in the content stream 30. Default elements can be inserted within the content stream 30 until a new content element 24 enters the queue. The default elements can be either a source with no preset end point, such as a live source, or a source with a fixed length, for example. For the source with no predetermined end point, the source can be included in the stream 30 and transmitted until another contribution or content element 24 is available within the queue. When using the source with a fixed length as a default element, the source can be repeatedly placed within the content stream 30 and transmitted until an additional content element 24 enters the queue.

A transitional element can be inserted within the content stream 30 between two content elements 24, between a content element 24 and a default element, or between a default element and a content element 24. The transitional element is used to transition from one content element 24 to another, but is not required. The transitional element can be used to indicate to the receiver of the content, an identification of the content previously transmitted, or the upcoming content to be transmitted, for example. In the case where the transitional element transitions from a first content element to a second content element, the transitional element can indicate the transition between the content elements. In the case where the transitional element transitions from a content element to a default element, the transitional element can indicate the transition from a content element to a default element. Where the transitional element transitions from a default element to a content element, the transitional element can indicate the transition from the default element to the content element. The transitional element can include a source with no fixed end point or a source having a fixed length. The transitional element can also be selected from a pool of transitional elements where a selection criteria is used to select an appropriate transitional element. For example, in the case of audio content elements, the transitional element can be an announcer indicating the transition between elements or can be an advertisement.

As illustrated in the example in FIG. 3, the content stream 30 provides content elements 24 and content fill elements 34 sequentially over time 35. Such distribution of the elements 24, 34 by the content stream 30 allows for a continuous and seamless supply of elements 24, 34 to a plurality of self-selecting destinations.

Figure 4:
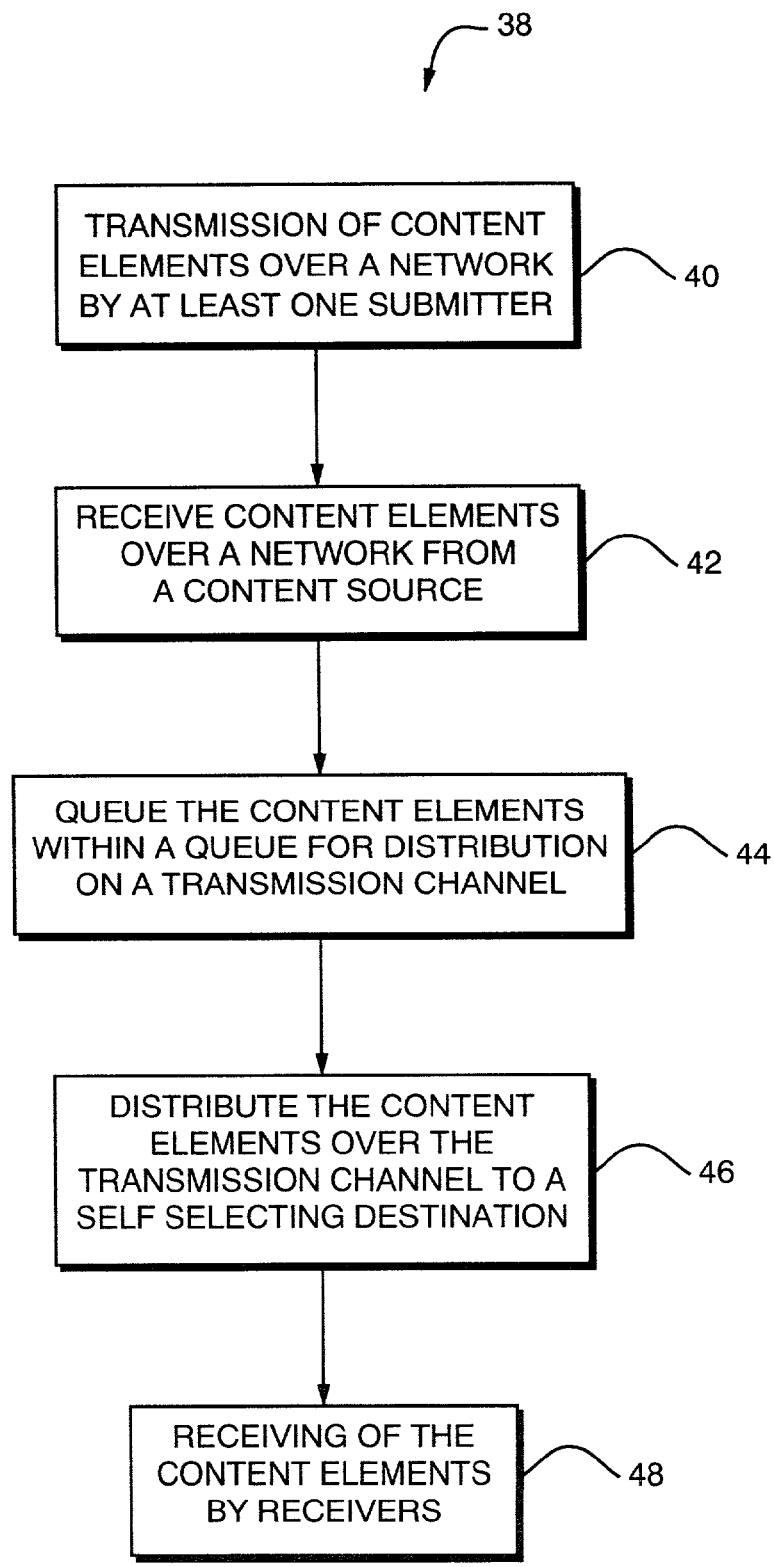
FIG. 4 illustrates a method for distributing content over a network distributor configured according to one example embodiment of the invention.

FIG. 4 illustrates a method for distributing content by a content server, given generally as 38. Initially, in step 40, content elements are transmitted over a network by at least one submitter or content source 20. In step 42, the content elements are received over the network from the content source 20. Next, in step 44, the content elements are queued for distribution on a transmission channel. The queuing can be performed by the content distributor and can be based upon a first-in, first-out (FIFO) ordering policy. Alternative ordering policies can also be used. As an example, certain content elements can be given priority over other content elements Generally, a content element is queued once within the queue. Alternate queuing policies can also be used. For example, a content element can be placed in the queue and distributed more than once based, for example, on an amount of payment made by the content provider 20 that submitted the content 24.

Next, in step 46, the content elements are distributed over the transmission channel to one or more self-selecting destinations. The transmission channel can include a plurality of channels whereby distribution of a content elements on a particular channel depends upon a criteria of the content element being distributed. For example, in the case where the content element to be distributed is an audio element and the audio element is a classical music audio element, the audio element can be distributed over a transmission channel that is assigned to carry audio elements classified as classical music audio elements. In step 48, the content elements are then received over the transmission channel by self-selecting content receivers. The steps of receiving content elements, queuing content elements, and transmitting content elements can be repeated so that the transmission channel supplies a continuous stream of content to content receivers.

Figure 5:
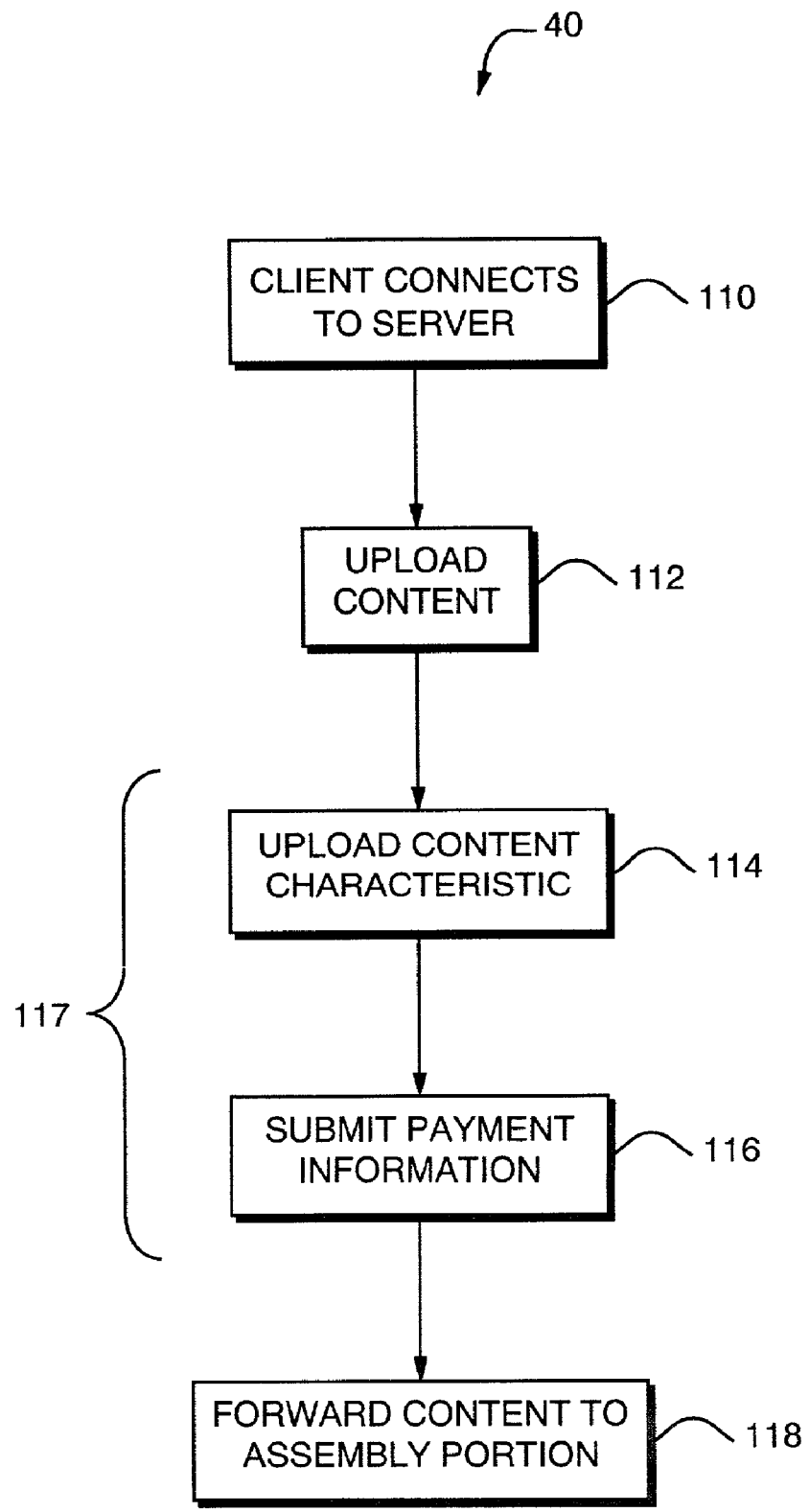
FIG. 5 illustrates the steps for transmitting content elements over a network distributor configured according to one example embodiment of the invention.

The step of transmitting content elements over a network 40 can include additional steps, illustrated in FIG. 5. In step 110, prior to transmitting content elements, a content source 20 first connects to a content server. In step 112, the content source then transmits or uploads a content element to the content server. When content elements 24 are received by the content server 26, each content element can include a descriptive information portion, given as illustrated at location 117 in FIG. 5. The descriptive information portion includes information relating to different aspects of the content element. In this example, in step 114, this descriptive information portion can include a content characteristic and, in step 116, can include payment information of the content element. While FIG. 5 illustrates the uploading of a content characteristic 114 prior to submitting payment information 116, the payment information can be submitted before, or simultaneously with, the content characteristic information. After reception of the content element 24 and the descriptive information, the content element 24 is forwarded to the assembly portion or module 118 for distribution.

When the descriptive information portion includes payment information, the payment information can include a monetary amount associated with a content element. The amount can be a sum that a content source has already paid or that a content source authorizes to be drawn from a preexisting account, for example. The payment information can be used to determine a distribution characteristic of the content element. For example, the distribution characteristics of the content elements can relate to distribution of the content over a particular channel, distribution of the content element at a particular fidelity, distribution of the content for a particular duration, or distribution of the content at a particular frequency or repetition rate.

Each of the distribution characteristics can be associated with a preset array of costs such that the service level for each distribution characteristic varies according to an amount paid by the content source. For example, the greater the amount paid, the relatively higher the level of service or network bandwidth the content source can receive. Payment of a relatively higher amount can provide distribution a content element over the network at a relatively high fidelity or quality or can provide distribution of the content over the network multiple times in one or more channels over a given period. The amount of payment can also determine the transmission channel(s) over which the content is distributed. For example, higher payments might be required for popular or more transmission channels while lower payments are required for the fewer or less popular channels. The amount of payment can also affect the amount of the content element distributed through the transmission channel. Payment of a relatively small amount can lead to the transmittal of only a portion of a relatively large content element, such as a sample, for example.

The payment information can also be used as a basis for arranging content elements in the queue with a particular order. For example, the content distributor can receive a first content element with a first payment information characteristic and can receive a second content element with a second payment information characteristic. The content distributor can then compare the first payment information characteristic of the first content element with the second payment characteristic of the second content elements and arrange the content elements in the queue according to this payment information characteristic. For example, a relatively larger amount of payment can cause one content element to be placed in the queue such that it is transmitted earlier than a content element with a relatively lower amount of payment. Therefore the queue is not necessarily ordered as a first-in, first-out (FIFO), but can be ordered according to a payment information characteristic or another priority queuing technique.

The descriptive information characteristic of the content elements can also include a content characteristic (one or more) of the content element 114. These content characteristics can describe an aspect(s) of the content element and can also be used to direct the distribution of the content element. For example, the content characteristic can include a title of a content element, a description of a content element, a type of content element, a source of a content element, a transmission channel designation for distribution of a content element, or a length of a content element and an originator of the content.

The title and description of a content element can be provided by a content source and can be transmitted to a content receiver as information relating to the content element. For example, in the case of an audio element, the title description of the element can provide the recipient with a description of the element or with contact information for the content source or purchase information for the content element or a better quality version of the content. Content source information can also be provided to a content receiver and can also be used to provide contact information to a content recipient. The content characteristic that indicates the type of content element can be used to describe the format of a content element. For example, the type of content element characteristic can describe whether the content is an audio, video, or text element.

The content characteristic can indicate a transmission channel for transmission of the content element. The transmission channel designation can indicate the transmission channel, over which the content element is to be distributed. For example, in a music distribution system, the system 10 can include a jazz channel, a classical channel, and a hard rock channel or other channels. The transmission channel designation can indicate which of these types of music channels the content element is to be distributed over. A content source can determine a transmission channel for a content element. This allows the content source to direct the content element towards a target receiving group. Alternately, a queue mechanism can determine the transmission channel for distribution of a content element. The queue mechanism can be part of the content distributor and can be used to determine the transmission channel for distribution of a content element and organize the element in a queue for transmission along a specific channel. For example, the queue mechanism can determine the transmission channel based upon the transmission channel designation for a content element. The mechanism can then queue the element for transmission along a particular channel based upon the transmission channel designation or upon another content characteristic. In the absence of a transmission channel designation of a content element, the queue mechanism can determine the proper transmission channel for distribution of the element, based upon the presence of other content characteristics for a content element. Any content characteristic can be used to determine the transmission channel for a content element. For example, the queue mechanism can queue the content element for transmission on a particular channel based upon the title or description of the content element.

The content elements can also be ordered within the queue according to the content characteristics of the content elements. For example, a second content element with a second length can be arranged in a queue before a first content element with a first length, based upon a comparison of the lengths, even if the first content element was received in the queue before the second content element. For example, in a distribution system where a default element is to be distributed at hourly intervals, it can be necessary to arrange content elements within a queue such that a relatively long element does not force the default element to be distributed at an interval greater than one hour. Therefore, based upon the relative length of the content elements within the queue, the content elements can be arranged such that the length of the content element distributed prior to the distribution of the default element does not cause the default element to be distributed beyond the hour interval. Such a queue function allows a steady content stream to be provided to content receivers 32.

Figure 6:
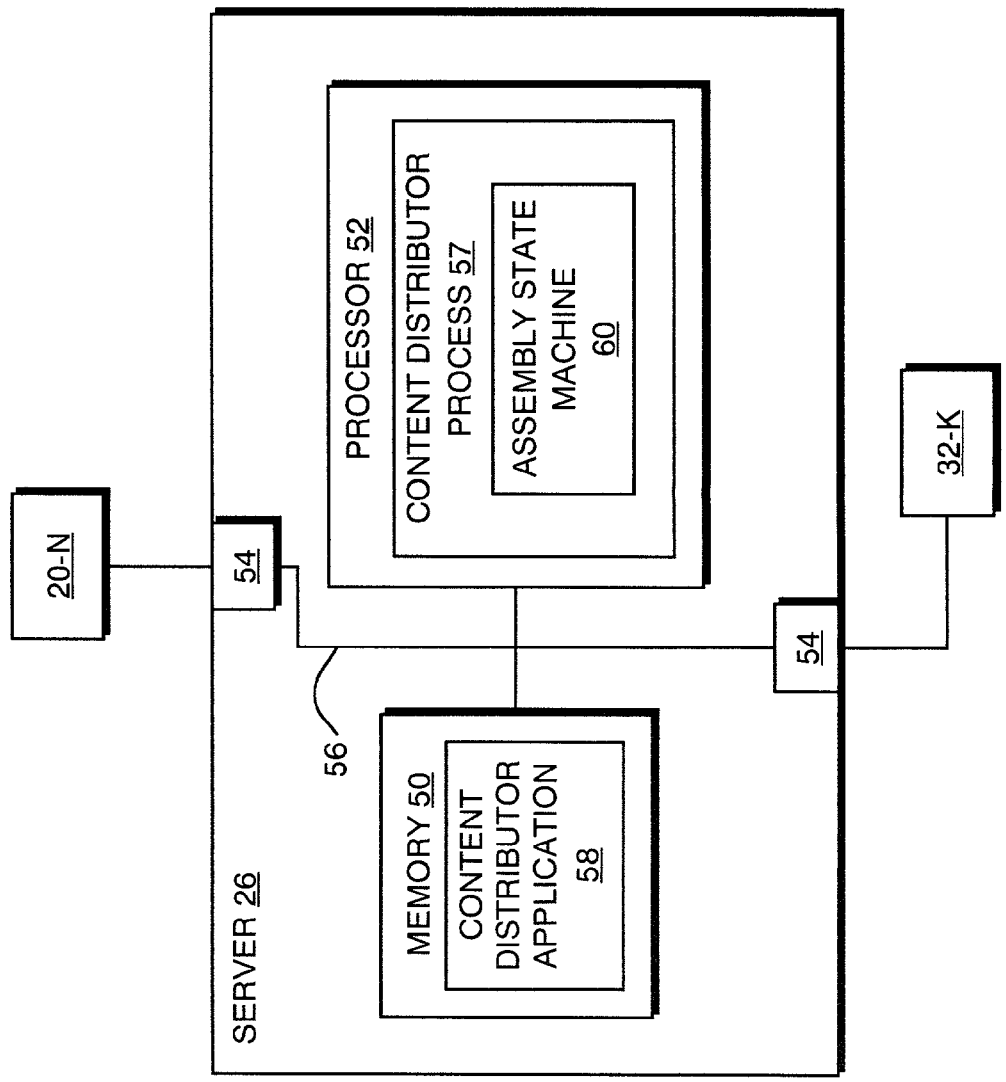
FIG. 6 illustrates a computerized device for distributing content distributor configured according to one example embodiment of the invention.

FIG. 6 illustrates a computer device or content server 26, that implies one embodiment of the invention. The server 26 includes an interconnection mechanism 56 such as a data bus or circuitry which interconnects a memory 50, a processor 52 and one or more communications interfaces 54. The memory 50 can be of any type of volatile or non-volatile memory or storage system such as a computer memory (e.g., random access memory (RAM), read only memory (ROM), or another type of memory) disk memory, such as hard disk, floppy disk, optical disk, for example. The memory 50 is encoded with logic instructions and/or data that, in one embodiment of the content distributor 28, forms a content distributor application 58 configured according to the embodiments of the invention. In other words, the content distributor application 58 represents software coding instructions and/or data that reside within the memory or storage 50, or with any computer readable medium accessible to the server 26. The processor 52 represents any type of circuitry or processing device such as a central processing unit, controller, application specific integrated circuit, or other circuitry that can access the content distributor application 58 encoded within the memory 50 over the interconnection mechanism 56 in order to run, execute, interpret, operate, or otherwise perform the content distributor application 58 logic instructions. In other words, in another embodiment of the content distributor 28, the content distributor process 57 represents one or more portions of the logic instructions of the content distributor application 58 while being executed or otherwise performed on, by, or in the processor 52 within the server 26.

Figure 7:
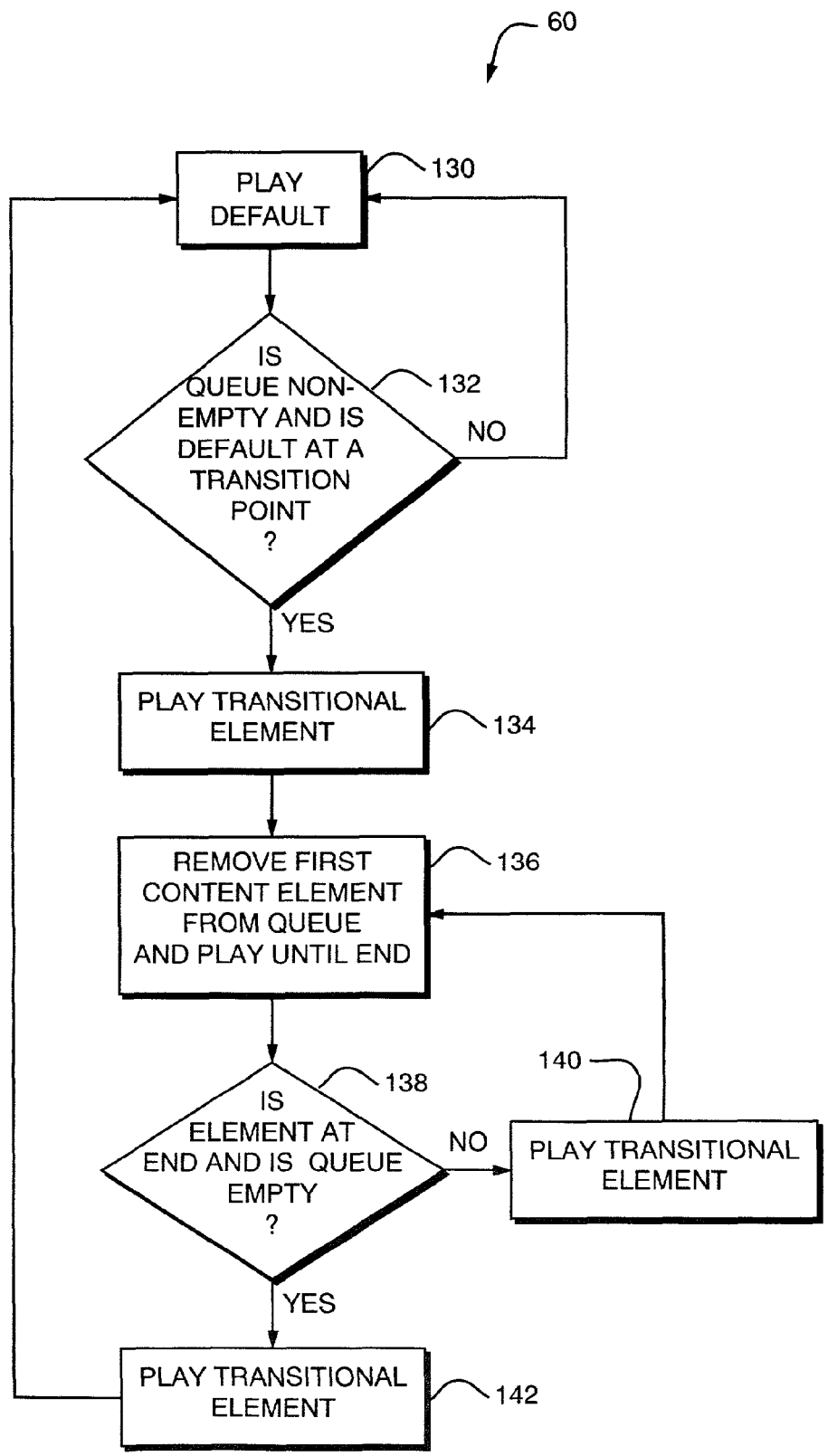
FIG. 7 illustrates a method used by assembly state machine for distribution content over a network distributor configured according to one example embodiment of the invention.

The content distributor process 57 includes an assembly state machine 60. The assembly state machine 60 determines the actions to be taken with respect to distribution of content elements 24 and content fill elements 34. Details of the actions taken by the assembly state machine 60 are illustrated in FIG. 7.

The starting state of the content distribution system 10 can be the default state. In the default state, a default element is played or distributed by the assembly state machine over a network in step 130. The default element can be distributed in its entirety or can be distributed up to an appropriate transition point, based upon the presence of a content element in the queue. The assembly state machine determines the status of the queue and the default element in step 132. The status of the queue is established by determining the presence of at least one content element within the queue or if the queue is non-empty. The status of the default element is established by determining if the default element is at an inappropriate transition point. An appropriate transition point for the default element can include an end portion of the default element or any point in the default element where transition to a content element does not interrupt the flow of content from the assembly state machine, for example. If either the queue is empty or if the default is at an inappropriate transition point, then the assembly state machine continues to distribute the default element. If the queue includes a content element and the default element is at an appropriate transition point, however, then the assembly state machine plays or distributes a transitional element between the default element and the content element in the queue in step 134. The transitional element can include a notification that the content receiver is experiencing a transition from the default element to the content element.

At the end of the distribution of the transitional element, the first content element from the queue is removed and distributed or played by the assembly state machine in step 136. Each content element within the queue can include an associated length or duration value. The length value can be determined by a content characteristic of the element, a distribution characteristic of the element or can be determined and assigned by the assembly state machine. The length value is used to determine an end point of the content element.

While the content element is distributed, the assembly state machine determines the status of the content element and the status of the queue in step 138. The status of the content element is established by determining if the content element has reached its end point based upon its length value. The status of the queue is established by determining presence of at least one content element within the queue. If the content element has reached the end point and if the queue is not empty, a transitional element is distributed or played (step 140) by the assembly state machine. After distribution of the transitional element in step 140, another content element is removed from the queue and distributed by the assembly state machine in step 136. If the content element has reached the end point and the queue is empty in step 142, a transitional element is distributed by the assembly state machine. After distribution of the transitional element, a default element is again distributed within the system 130.

While this invention has been particularly shown and described with references to preferred embodiments thereof, it will be understood by those skilled in the art that various changes in form and details may be made therein without departing from the scope of the invention encompassed by the appended claims.

While the content distribution system illustrated in FIG. 2 is shown with the network 22 including both the input and output portions of the server 26, other arrangements are possible. With respect to the input portion of the server 26, for example, the server 26 can receive content 24 or input from a computer network, such as the Internet or a private or local area network where the server 26 does not form part of the input network. The server 26 can also receive content from a content distributor 20 by telephone dial-up connection made by the content distributor 20 to the server 26. In this example, the transfer of content from a source 20 to a server 26 does not take place over a computer network 22, such as the internet. With respect to the output portion of the server 26, the server 26 can distribute content 24 to a network, such as the internet or a private network, where the server 26 does not form part of the output network. This includes multicasting of content over the internet. The server 26 can also output or distribute content to a radio transmitting station or radio station for broadcast where there is no computer network connecting the server to the radio station.

What is claimed is:

1. A method for distributing content, comprising:
 queuing, in a content distributor, a plurality of content elements within a queue that specifies a predetermined order in which to distribute the plurality of content elements on a transmission channel that is selected from a plurality of transmission channels each having a different channel content type, wherein the transmission channel is selected based on a first property of at least one content element in the plurality of content elements;
 receiving, in the content distributor, a user-created content element from a first user over a network;
 inserting the received user-created content element into the plurality of content elements, at a position determined based on at least one of (i) a second property of the received user-created content element or (ii) a characteristic associated with the first user; and
 distributing, by the content distributor, the user-created content element over the transmission channel to a self-selecting destination, responsive to receiving, from the self-selecting destination, a request that specifies the channel content type of the transmission channel.

2. The method of claim 1, wherein at least one property of the at least one content element comprises payment information related to the at least one content element.

3. The method of claim 2 wherein the payment information determines at least one distribution characteristic of the content element.

4. The method of claim 2 wherein the distribution characteristic is chosen from the group consisting of a transmission channel for distribution of a content element, a fidelity of distribution of a content element, a duration of distribution of a content element, or a frequency of distribution of a content element.

5. The method of claim 2 further comprising:
 receiving a first payment information characteristic for a first content element;
 receiving a second payment information characteristic for a second content element; and
 arranging the first content element and the second content element within the queue based upon a comparison between the first payment information and the second payment information.

6. The method of claim 1 wherein the position at which the user-created content element is inserted into the plurality of content elements is determined based at least in part on payment information related to the first user.

7. The method of claim 1 wherein at least one property of the at least one content element comprises at least one content characteristic, and wherein the content characteristic is chosen from the group consisting of a title of a content element, a description of a content element, a type of a content element, a source of a content element, a transmission channel designation for distribution of a content element, or a length of a content element.

8. The method of claim 7 further comprising arranging the at least one content element within the queue according to the content characteristic of the content element.

9. The method of claim 7 wherein distribution of the content element on a transmission channel is based upon the content characteristic of the content element.

10. The method of claim 1 further comprising determining the presence of at least one content element within the queue.

11. The method of claim 10 further comprising, in the presence of at least one content element within the queue, distributing a transitional element over the transmission channel before the distribution of a content element, located within the queue, over the transmission channel.

12. The method of claim 10 further comprising distributing a default element over the transmission channel in the absence of at least one content element within the queue.

13. The method of claim 12 further comprising determining a transition point for the default element in the presence of at least one content element within the queue.

14. The method of claim 1 wherein the content source determines the transmission channel for distribution of the content element.

15. The method of claim 1 wherein a queue mechanism determines the transmission channel for distribution of the content element.

16. The method of claim 1 further comprising the step of repeating the steps of receiving, queuing, inserting and distributing for a plurality of content elements such that the transmission channel supplies a continuous stream of content to a plurality of self-selecting destinations.

17. A computerized device, comprising:
 at least one communications interface;
 a memory;
 a processor; and
 an interconnection mechanism coupling the at least one communications interface, the memory and the processor;
 wherein the memory is encoded with a distribution application that when performed on the processor, produces a distributor process that causes the computerized device to perform the operations of:
 queuing, in a content distributor, a plurality of content elements within a queue that specifies a predetermined order in which to distribute the plurality of content elements on a transmission channel that is selected from a plurality of transmission channels each having a different channel content type, wherein the transmission channel is selected based on a first property of at least one content element in the plurality of content elements;
 receiving, in the content distributor, a user-created content element from a first user over a network;
 inserting the received user-created content element into the plurality of content elements, at a position determined based on at least one of (i) a second property of the received user-created content element or (ii) a characteristic associated with the first user;
 distributing, by the content distributor, the user-created content element over the transmission channel, via the at least one communications interface, to a self-selecting destination, responsive to receiving, from the self-selecting destination, a request that specifies the channel content type of the transmission channel;
 determining the presence of at least one content element within the queue, and in the presence of at least one content element within the queue, distributing a transitional element over the transmission channel before the distribution of a content element located within the queue over the transmission channel, and determining a transition point for the default element; and
 in the absence of at least one content element within the queue, distributing a default element over the transmission channel.

18. The computerized device of claim 17 further comprising performing the operation of receiving payment information from the content source, the payment information related to the at least one content element.

19. The computerized device of claim 18 wherein the payment information determines at least one distribution characteristic of the content element.

20. The computerized device of claim 19 wherein the distribution characteristic is chosen from the group consisting of a transmission channel for distribution of a content element, a fidelity of distribution of a content element, a duration of distribution of a content element, or a frequency of distribution of a content element.

21. The computerized device of claim 17 further comprising performing the operation of:
   receiving a first payment information for a first content element;
   receiving a second payment information for a second content element; and
   arranging the first content element and the second content element within the queue based upon a comparison between the first payment information and the second payment information.

22. The computerized device of claim 17 wherein the position at which the user-created content element is inserted into the plurality of content elements is determined based at least in part on payment information related to the first user.

23. The computerized device of claim 17 wherein the content element comprises at least one content characteristic, and wherein the content characteristic is chosen from the group consisting of a title of a content element, a description of a content element, a type of a content element, a source of a content element, a transmission channel designation for distribution of a content element, or a length of a content element.

24. The computerized device of claim 23 further comprising performing the operation of arranging the at least one content element within the queue according to the content characteristic of the content element.

25. The computerized device of claim 23 wherein distribution of the content element on a transmission channel is based upon the content characteristic of the content element.

26. The computerized device of claim 17 wherein the content source determines a transmission channel for distribution of the content element.

27. The computerized device of claim 17 wherein a queue mechanism determines a transmission channel for distribution of the content element.

28. The computerized device of claim 17 further comprising performing the operation of repeating the steps of receiving, queuing, inserting and distributing for a plurality of content elements such that the transmission channel supplies a continuous stream of content to a plurality of self-selecting destinations.

29. A computer program product having a computer-readable medium including computer program logic encoded thereon that, when performed on a processor in a computerized device having a coupling of a memory, a processor, and at least one communications interface provides a method for performing the operations of:

queuing, in a content distributor, a plurality of content elements within a queue that specifies a predetermined order in which to distribute the plurality of content elements on a transmission channel that is selected from a plurality of transmission channels each having a different channel content type, wherein the transmission channel is selected based on a first property of at least one content element in the plurality of content elements;

receiving, in the content distributor, a user-created content element from a first user over a network;

inserting the received user-created content element into the plurality of content elements, at a position determined based on at least one of (i) a second property of the received user-created content element or (ii) a characteristic associated with the first user; and distributing, by the content distributor, the user-created content element over the transmission channel to a self-selecting destination, responsive to receiving, from the self-selecting destination, a request that specifies the channel content type of the transmission channel.

30. A computerized device, comprising:
at least one communications interface;
a memory;
a processor; and
an interconnection mechanism coupling the at least one communications interface, the memory and the processor;
wherein the memory is encoded with a distributor application that when performed on the processor, produces a means to distribute content, such means including:

means for queuing, in a content distributor, a plurality of content elements within a queue that specifies a predetermined order in which to distribute the plurality of content elements on a transmission channel that is selected from a plurality of transmission channels each having a different channel content type, wherein the transmission channel is selected based on a first property of at least one content element in the plurality of content elements;

means for receiving, in the content distributor, a user-created content element from a first user over a network;

means for inserting the received user-created content element into the plurality of content elements, at a position determined based on at least one of (i) a second property of the received user-created content element or (ii) a characteristic associated with the first user; and means for distributing, by the content distributor, the user-created content element over the transmission channel, via the at least one communications interface, to a self-selecting destination, responsive to receiving, from the self-selecting destination, a request that specifies the channel content type of the transmission channel.

* * * * *